United States Patent
Baldwin

(10) Patent No.: US 9,280,910 B2
(45) Date of Patent: *Mar. 8, 2016

(54) SYSTEM AND METHOD FOR IMPROVED HUMAN LEARNING THROUGH MULTI-SENSORY STIMULUS

(71) Applicant: AT&T Intellectual Property I, L.P., Atlanta, GA (US)

(72) Inventor: Christopher Baldwin, Algonquin, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/716,080

(22) Filed: May 19, 2015

(65) Prior Publication Data

US 2015/0248842 A1 Sep. 3, 2015

Related U.S. Application Data

(63) Continuation of application No. 13/487,846, filed on Jun. 4, 2012, now Pat. No. 9,070,301.

(51) Int. Cl.
G09B 17/00 (2006.01)
G09B 17/04 (2006.01)
G09B 5/06 (2006.01)

(52) U.S. Cl.
CPC ............... *G09B 17/006* (2013.01); *G09B 5/06* (2013.01); *G09B 17/00* (2013.01); *G09B 17/003* (2013.01); *G09B 17/04* (2013.01)

(58) Field of Classification Search
CPC ....................................................... G09B 17/00
USPC ........................................................ 434/178
See application file for complete search history.

(56) References Cited

U.S. PATENT DOCUMENTS

| 2003/0043196 | A1 | 3/2003 | Gibson |
| 2007/0248938 | A1 | 10/2007 | Ronald |
| 2011/0177481 | A1 | 7/2011 | Haff et al. |

OTHER PUBLICATIONS

Schneider N, Dorr M, Pomarjanschi L, and Barth E., "Improving Reading Capability of Children with Developmental Dyslexia with a Gaze-Contingent Display," Institute for Neuro-und Bioinformatics, University of Lüeck (http://www.perceptionweb.com/abstract.cgi?id=v110192 *Perception* 40 ECVP Abstract Supplement, p. 124), 2011.

*Primary Examiner* — Xuan Thai
*Assistant Examiner* — Robert P Bullington

(57) ABSTRACT

Disclosed herein are systems, methods, and computer-readable storage media for improving human learning by providing multi-sensory stimulus. A system narrates a text to a user at a narration pace, while determining a focal point of the user's gaze using both a camera and eye tracking analysis. The system determines a user pace based on a shift in the gaze focal point during narration of the text, then adjusts the narration pace based on the user pace. The adjustment is performed based on a selection of a retention mode and a development mode. The retention mode maintains the narration pace with the user pace for maximal user retention of the text. The development mode increases the narration pace with respect to the user pace for user reading rate acceleration.

20 Claims, 5 Drawing Sheets

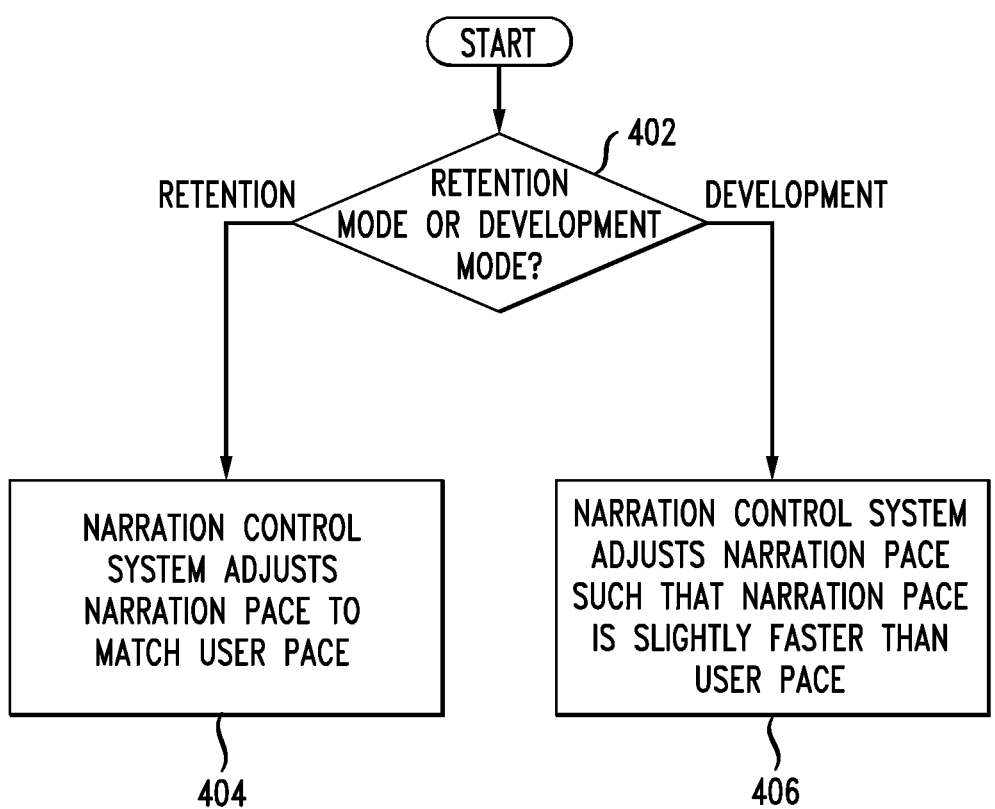

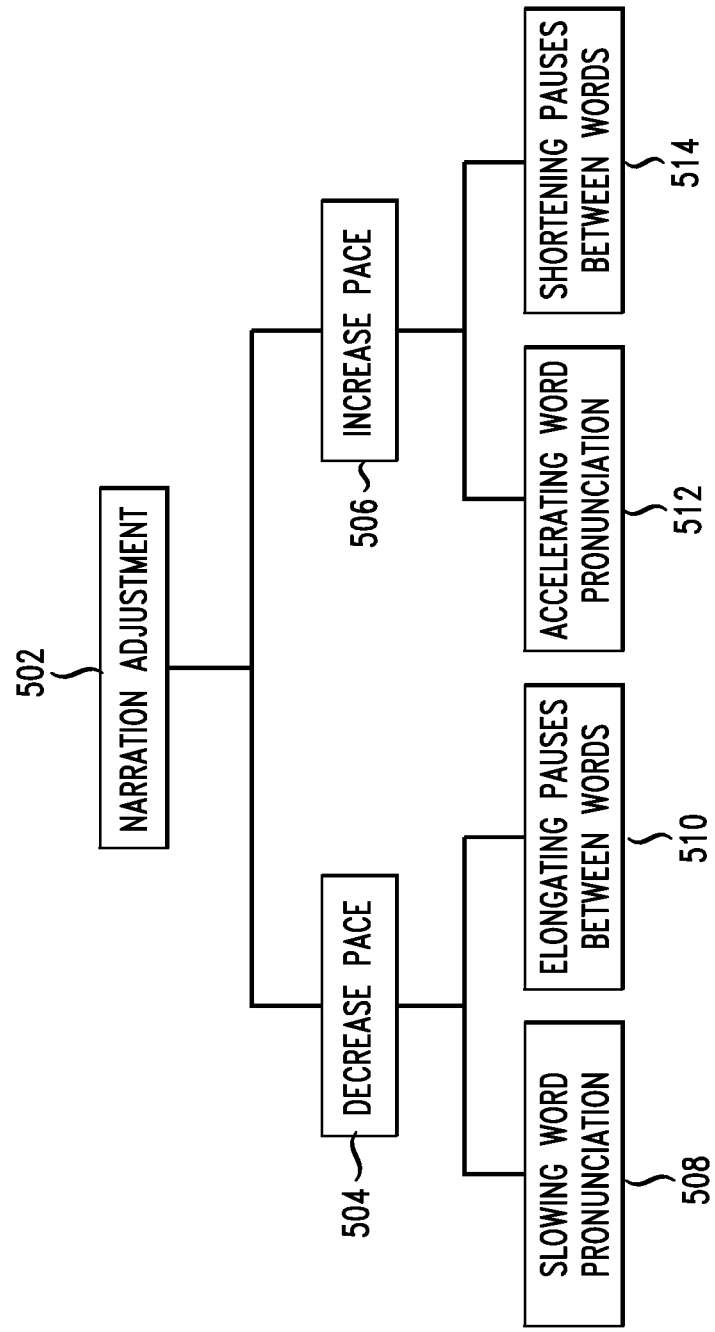

SYSTEM AND METHOD FOR IMPROVED HUMAN LEARNING THROUGH MULTI-SENSORY STIMULUS

PRIORITY INFORMATION

The present invention is a continuation of U.S. patent application Ser. No. 13/487,846, filed Jun. 4, 2012, the contents of which is incorporated herein by reference in its entirety.

BACKGROUND

1. Technical Field

The present disclosure relates to providing human learning using a system that narrates text to a user and determines, based on a gaze focal point of the user. whether to adjust a narration pace.

2. Introduction

Reading programs can help people learn to read better, faster, and can help increase reading retention by focusing on phonics, vocabulary, and comprehension. Reading programs can also be designed to increase reading speed. Many reading programs provide multimedia presentations using a combination of text, audio, video, images, and animation while simultaneously allowing users to interact with the program. A classic example is the bouncing ball cartoons made for young children still learning to read. In the bouncing ball cartoons, when the children hear a word and see the ball bouncing on that word, it reinforces associations made in the child's mind between the word and its audible pronunciation. Developing multiple sensory stimulus learning systems can similarly aid in education and effective presentations. For example, reading a book, while simultaneously listening to a narration of that book, can reinforce learning. Similarly, many opt to watch television with closed captioning, even when they have excellent hearing, because they not only wish to hear the television but see the dialog, thereby better understanding and internalizing the dialog.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates a block diagram of narration modes;
and
FIG. 5 illustrates a block diagram of narration pace adjustments.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure presents improved human learning through multi-sensory stimulus. A system, method and computer-readable media are disclosed which provide multi-sensory stimulus based on user reading ability. A brief introductory description of a basic general purpose system or computing device in FIG. 1 which can be employed to practice the concepts is disclosed herein. A more detailed description of providing text narration based on user reading ability will then follow.

Figure 1:
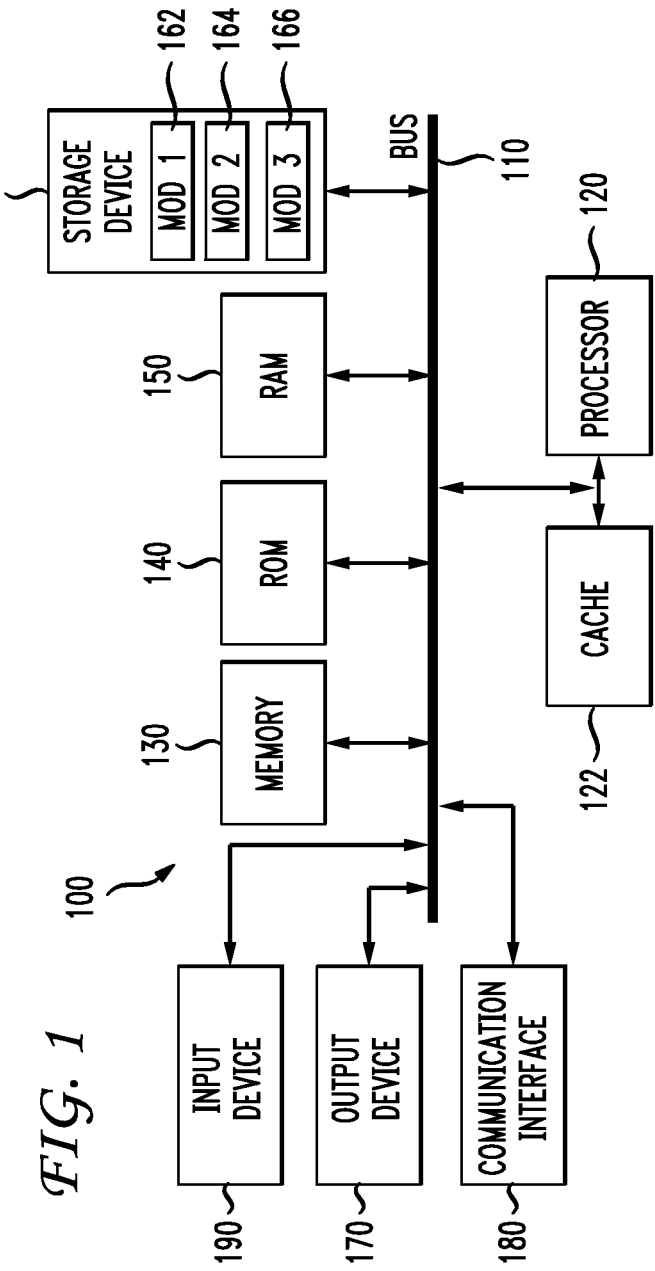
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
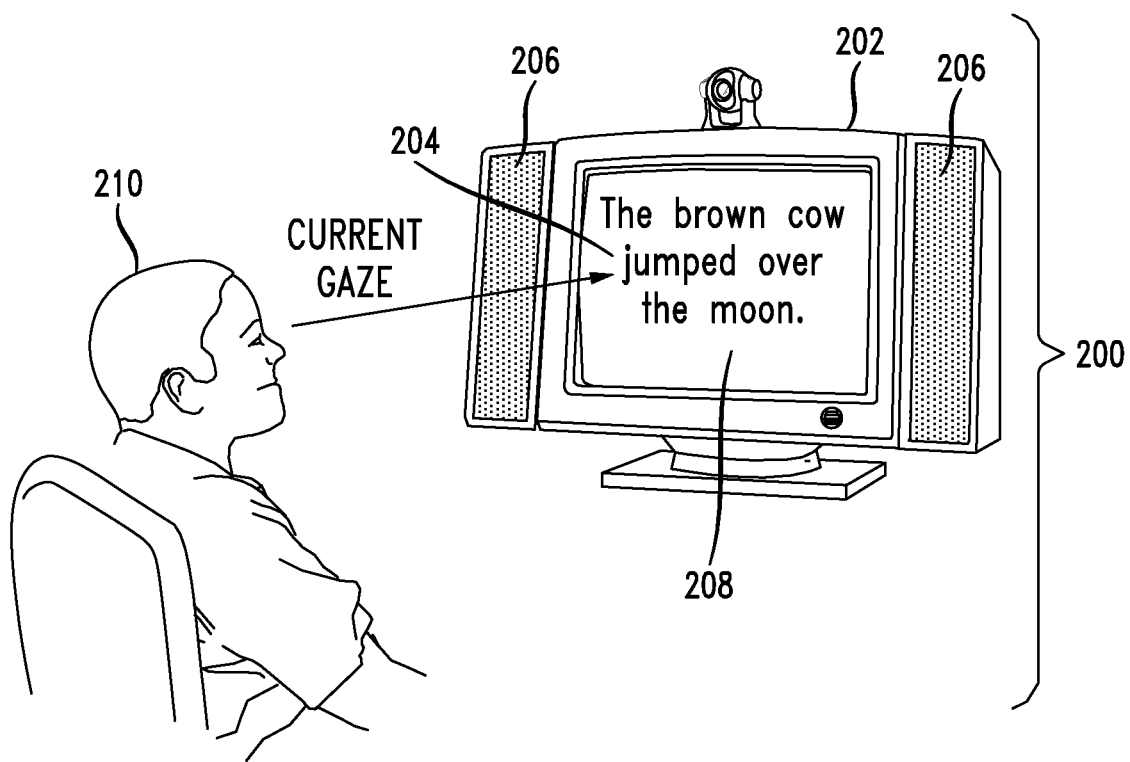
FIG. 2 illustrates an exemplary vision/audio embodiment.

Having disclosed some components of a computing system, the disclosure now turns to FIG. 2, which illustrates an exemplary video/audio embodiment 200. A reader 210 can improve reading retention using the multi-sensory system 200 illustrated by using the sense of sight to read text 208 on a screen while using the sense of hearing to hear a narration of the same text 208. The screen 202 can be any monitor or device capable of displaying text such as a computer monitor, laptop computer screen, television, smartphone, etc. A user 210 can then read text 208 on a computer monitor 202 while a narration of the text 208 is provided simultaneously through the speakers 206.

The system 200 provides feedback pertaining to a user's gaze 204 for use in synchronizing a narration pace with a user's reading pace using a camera. The camera used to track eye gaze 204 can be built into the screen 202, such as in a smartphone or a tablet computer, or alternatively can be a peripheral device attached to a computer or other electronic associated with the screen 202. The camera used in tracking a user's gaze 204 can work with an eye tracking analysis program to detect the current location of a user's gaze 204 on the display 202 and can send the gaze information to the eye tracking program for further analysis. The system 200 has at least a camera, a display 202, and speakers 206. The speakers output a narration of text while the user 210 is reading the text 208. By seeing and hearing the text 208 multiple senses are engaged, and the user 210 can improve their learning process.

In another configuration, the system 200 can be altered such that the camera is used to track hand movement instead of eye movement for blind readers reading Braille. The camera can be fixed on a hand moving across a physical copy of the text or a digital device such as a Braille terminal during narration of the text. In this configuration, the sense of hearing is engaged as the user hears the narration of the text, while the tactile sense is engaged by feeling the Braille with the hand. In this manner multi-sensory learning is occurring. By synchronizing the narration with the focal point of a user's gaze, or the user's hand movement, the system 200 engages in multi-sensory learning. The system 200 can improve this multi-sensory learning by improving reading speed and/or retention for the user 210. Other applications include touch sensitive displays that have the ability to generate tactile feedback for the visually impaired. The system can provide tactile feedback for visually impaired users attempting to assess or improve their vision. A user can use his hands to follow along with narrated portions of a text on a touch screen while the system provides feedback to the user. For example, the system can direct the user to touch certain words or phrases in differing fonts, colors and point size to assess vision and provide feedback to the user. Optionally, on-screen texts can slowly change in point size over time to determine user ability or improve vision. For example, the system can slowly decrease the point size of on-screen text for a visually-impaired user attempting to improve their vision while the user follows along using his hands. Other applications involving touch screens that generate tactile feedback are contemplated.

Figure 3:
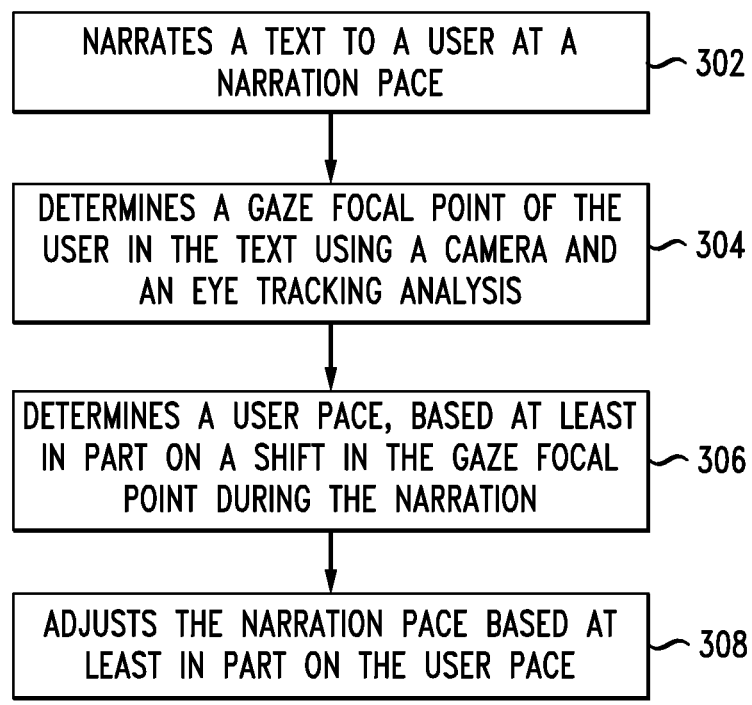
FIG. 3 illustrates an exemplary method embodiment.

FIG. 3 illustrates an exemplary method for improving the reading speed and/or retention of the user. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

A system 100 implementing the method narrates a text to a user at a narration pace while the user reads the text 302. The text can be determined by the user or the system 100. For example the user could search for a particular text such as a textbook or novel, or the system 100 could automatically determine the text based on reading level, previous texts read, recommendations, etc. The narration pace can be determined by the user or the system 100 automatically. The narration pace can be based on reading level, recent reading scores, text difficulty, language, etc. Once the narration begins, the system 100 determines a gaze focal point of the user in the text using a camera and an eye tracking analysis. The system 100 then determines, based at least in part on a shift in the gaze focal point during narration of the text, a user pace 306. The system 100 can then adjust the narration pace based at least in part on the user pace 308.

In certain configurations when the user pace falls outside of an acceptable range the system 100 can adjust the narration pace. This range can be automatically determined by the system 100 based on a user history or other factors. For example, the system can determine, based on the user history that after half an hour of reading the user's pace normally slows by 5 words per minute. The acceptable range for the user pace can start at a given value, then decrease by 5 words per minute at the half hour mark. Alternatively, the range can be selected by the reader. For example, the user could configure the system 100 such that the narration pace is not changed unless, over a period of 2 minutes the user's pace is averaging more or less than 5 words from the narration location.

The narration pace itself is adjusted based at least in part on a shift in the gaze focal point maintained by the user during the narration. Other factors which can affect the adjustment can include reading pace patterns; previous reading history; predicted difficulty; reading patterns of friends, classmates, or peers; an analysis of word pronunciation; difficulty of forthcoming words; foreign word usage; technical word usage; meter, rhythm, or rhyming associated with the text. For example, if a text contains technical words, or foreign words, the system 100 can slow the narration pace based on a prediction that the user's pace will slow upon encountering those words. If the text has been previously read by many friends or peers of the user, the system 100 can base the narration pace on the paces of those peers. Should the text contain an interesting meter, such as Iambic Pentameter, the narration can modify the syllabic emphasis, and the rhythm of the narration, based on this interesting meter.

How the narration pace is adjusted depends on a user selection of either a retention mode or development mode. FIG. 4 illustrates a block diagram of narration modes the user can select 402. In retention mode 404, the system maintains the narration pace with the user pace to engage multiple senses for increased retention of learned material 404. In development mode 406, the system maintains the narration pace at a slightly faster rate with respect to the user pace to aid in increasing the user pace 406. In some configurations, should the user pace fall outside of an acceptable range for either retention mode or development mode, the system adjusts the narration pace accordingly.

FIG. 5 illustrates adjusting narration pace. The narration pace can be adjusted 502 by decreasing the pace 504 or increasing the pace 506. The system can decrease the pace 504 by slowing word pronunciation 508 and elongating pauses between words 510. The system can increase the narration pace 506 by accelerating word pronunciation 512 and shortening pauses between words 514. The system can work in conjunction with any text to speech generator, so long as the previously mentioned adjustable features (pace/cadence, pronunciation timing, etc.) are present and adjustable.

In one example, a narration pace can be 230 words per minute (wpm) set by the system or the user, and the system can determine the user pace to be 220 wpm based on the shift in the gaze focal point of the user. In retention mode, the narration pace can be decreased to match the user pace for increased retention of the text. In development mode, the system could maintain, or increase, the narration pace to aid the user in increasing their reading speed. For example, a narration pace can be 160 wpm. The system can determine the user pace to be 160 wpm based on the shift in the gaze focal point during narration of the text. In the development mode, the system would then increase the narration pace to slightly faster than the user pace, such as a 170 wpm, to aid the user in obtaining a faster reading speed. Synchronizing narration with eye gaze using multiple senses can benefit readers of all ages, ranging from children just learning to read to adults that have learned to read incorrectly or poorly. It can be utilized in educational institutions in the transition from physical text books to digital texts on mobile devices in schools around the world.

In one embodiment, the system can record the user pace to track reading improvement over time. A user, teacher, or parent can then review a history of user paces to monitor reading improvement or regression. For example, a teacher can use the system to check individual reading assignment progress. A teacher can also use the system to determine the appropriateness of a text for a particular age group based on the reading rates of the students. For example, a teacher can assign a class to read Huckleberry Finn using the system, and he can periodically check assignment progress. Using this information the teacher can plan his classes more effectively, because he knows the reading progress of each student.

Parents can use the system to check children's homework completion. For example, a child can tell his parent that he completed his reading assignment in record time. The parent can verify it was actually read based on feedback from the reading program. If the system indicates that the child's pace was too fast for reasonable retention, or that the child didn't actually read (that is, maintain a gaze on the words), the parent can have the child reread the text. In addition to monitoring assignment completion, the system can be used for improving reader ability. Reader ability can be improved by tracking identified problematic words, word types and word sequences and focusing on improving those problem areas. For example, the system may determine that a student has particular difficulty with the "th" sound based on feedback from the eye gaze tracking system. This determination can be made by the tracking system identifying that the student spends more time looking at words beginning or ending in "th" than other word types. This information can be used to adjust narration speed, for example, around words having "th" in them, to allow the student more time to process the word. In yet another example, document editors can have the text they are editing narrated to them by a system configured according to the disclosed method. Should the document editors skip a section, the system (which is simultaneously narrating the text based on the editor's gaze) can jump narration to the next section and mark the skipped section for later review.

Other embodiments can warn the user, either visually, through vibrations, or audible notification, when a problematic sound, word, or word sequence is approaching. The system can use tracked difficulties to select text either with fewer or more difficulties based on user preference. For example, a reader can select a text with fewer difficulties when he is short on time, or select a more challenging text when he has more time to devote to improving reading skills. Alternately, the system can automatically select texts based on predetermined settings for a particular reader based on problem areas. For example, if the system has detected that certain words greatly slow down the user, the system can recommend texts based on the frequency of those certain words in the texts. Thus a reader desiring speed, but who is slowed down by Latin phrases, would be presented reading options based on the absence of Latin phrases, whereas a reader desiring retention might be presented reading options having a high frequency of Latin phrases.

Other options may also be selected in addition to just narration pace. For example, based on any of the parameters and determinations identified herein—the system could select a different voice for each mode or a different voice than what was previously used rather than adjusting the narration speed. For example, a higher pitched voice might sound like it is at a higher narration speed but it is not. Thus, voice gender, pitch, or any other factor can be selected as an alternate to or also additional to the adjustment in narration pace. In addition, the system could change accents or adjust the narration to match a desired age, nationality, or social group.

The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As disclosed above, the systems, methods, and computer-readable storage media are provided for improving human learning through multi-sensory stimulus. An example of a system includes a processor and a computer readable medium storing instructions which, when executed by the processor, cause the processor to perform a method that narrates text to a user as the user simultaneously reads the text, and uses a camera to track the user's gaze and match the narration to where in the text the user is currently reading. The system can aid reading retention by synchronizing text narration with the focal point of the user's gaze. The system can also determine, based on shifts in the gaze focal point, the user's pace. The system can then use the user's pace to adjust the narration pace according to a selected narration mode.

In a retention mode, the system maintains the narration pace with the user's pace to engage multiple senses for increased retention of learned material. In a development mode, the system maintains the narration pace at a slightly faster rate with respect to the user's pace, thereby teaching the user to read faster. When the user pace falls outside of an acceptable range for either retention mode or development mode, the system adjusts the narration pace accordingly. The narration pace can be adjusted by slowing the pace or increasing the pace. Slowing the pace can be accomplished by slowing word pronunciation and elongating pauses between words, while increasing the narration pace can be accomplished by accelerating word pronunciation and shortening pauses between words.

The system can track the user's pace over time to monitor trends in reading improvement or regression. The system can further track identified problematic words, word types, word sequences, and other reading problems. Teachers, parents, or system administrators can then utilize these trends and identified reading problems to focus on improving specific problem areas.

Embodiments within the scope of the present disclosure may also include tangible and/or computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. In one aspect, the computer readable medium is non-transitory. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can apply to a Braille reading and narration system, where the user reads using his hands instead of his eyes. Those skilled in the art will readily recognize various modifications and changes that may be made to the principles described herein without following the example embodiments and applications illustrated and described herein, and without departing from the spirit and scope of the disclosure.

I claim:
1. A method comprising:
   determining, using a camera, a gaze focal point of a user reading a text;

determining, via a processor and based on a shift in the gaze focal point during narration of the text to the user, a user reading pace; and adjusting a narration pace of the narration based on the user reading pace and a predicted pace, where the predicted pace is determined based on a reading pattern of an individual other than the user.

2. The method of claim 1, further comprising adjusting the narration pace based on one of a retention mode and a development mode.

3. The method of claim 2, wherein the retention mode maintains the narration pace with the user pace for maximal retention.

4. The method of claim 2, wherein the narration pace is faster than the user pace in the development mode.

5. The method of claim 1, further comprising adjusting the narration pace by one of slowing word pronunciation, accelerating word pronunciation, elongating pauses between words, and shortening pauses between words.

6. The method of claim 1, further comprising adjusting the narration pace when the user pace falls outside of an acceptable range.

7. The method of claim 1, further comprising utilizing the user pace to track reading improvement.

8. The method of claim 1, further comprising utilizing one of identified words, word types, and word sequences to improve user reading ability.

9. A system comprising:
a processor; and
a computer-readable storage medium having instructions stored which, when executed by the processor, cause the processor to perform operations comprising:
determining, using a camera, a gaze focal point of a user reading a text;
determining, based on a shift in the gaze focal point during narration of the text to the user, a user reading pace; and
adjusting the narration pace of the narration based on the user reading pace and a predicted pace, where the predicted pace is determined based on a reading pattern of an individual other than the user.

10. The system of claim 9, the computer-readable storage medium having additional instructions stored which, when executed by the processor, cause the processor to perform operations comprising adjusting the narration pace based on one of a retention mode and a development mode.

11. The system of claim 10, wherein the retention mode maintains the narration pace with the user pace for maximal retention.

12. The system of claim 10, wherein the narration pace is faster than the user pace in the development mode.

13. The system of claim 9, the computer-readable storage medium having additional instructions stored which, when executed by the processor, cause the processor to perform operations comprising adjusting the narration pace by one of slowing word pronunciation, accelerating word pronunciation, elongating pauses between words, and shortening pauses between words.

14. The system of claim 9, the computer-readable storage medium having additional instructions stored which, when executed by the processor, cause the processor to perform operations comprising adjusting the narration pace when the user pace falls outside of an acceptable range.

15. The system of claim 9, the computer-readable storage medium having additional instructions stored which, when executed by the processor, cause the processor to perform operations comprising utilizing the user pace to track reading improvement.

16. The system of claim 9, the computer-readable storage medium having additional instructions stored which, when executed by the processor, cause the processor to perform operations comprising utilizing one of identified words, word types, and word sequences to improve user reading ability.

17. A computer-readable storage device having instructions stored which, when executed by a computing device, cause the computing device to perform operations comprising:
determining, using a camera, a gaze focal point of a user reading a text;
determining, based on a shift in the gaze focal point during narration of the text to the user, a user reading pace; and
adjusting the narration pace of the narration based on the user reading pace and a predicted pace, where the predicted pace is determined based on a reading pattern of an individual other than the user.

18. The computer-readable storage device of claim 17, the computer-readable storage medium having additional instructions stored which, when executed by the computing device, cause the computing device to perform operations comprising adjusting the narration pace based on one of a retention mode and a development mode.

19. The computer-readable storage device of claim 18, wherein the retention mode maintains the narration pace with the user pace for maximal retention.

20. The computer-readable storage device of claim 18, wherein the narration pace is faster than the user pace in the development mode.

* * * * *